United States Patent [19]

Nakano et al.

[11] Patent Number: 4,655,979
[45] Date of Patent: Apr. 7, 1987

[54] PROCESS FOR PRODUCTION OF CELLULAR CONCRETE

[75] Inventors: Sota Nakano, Tokyo; Masaaki Ozawa, Niiza, both of Japan

[73] Assignee: Misawa Home Kabushiki Kaisha, Tokyo, Japan

[21] Appl. No.: 730,745

[22] Filed: May 6, 1985

[30] Foreign Application Priority Data

Nov. 2, 1984 [JP] Japan .................. 59-231831

[51] Int. Cl.⁴ .......................... B28B 1/50; B28B 5/00; C04B 7/32; C04B 22/10

[52] U.S. Cl. ......................... 264/42; 106/88; 106/95; 106/314; 106/315; 264/234; 264/347; 264/DIG. 59

[58] Field of Search ................ 106/88, 95, 314, 315; 264/42, DIG. 59, 234, 347

[56] References Cited

U.S. PATENT DOCUMENTS

| 427,591 | 5/1890 | Martin et al. | 106/315 X |
| 2,848,340 | 8/1958 | Haldas | 106/315 X |
| 3,615,223 | 10/1971 | Burrqugas et al. | 106/315 X |
| 3,772,045 | 11/1973 | Haldas et al. | 106/315 X |
| 4,057,608 | 11/1977 | Hashimoto et al. | 264/42 |
| 4,190,454 | 2/1980 | Yamagisi et al. | 106/315 X |

FOREIGN PATENT DOCUMENTS

| 52-76328 | 6/1977 | Japan | 106/315 |
| 57-27953 | 2/1982 | Japan | 106/314 |

Primary Examiner—Philip Anderson
Attorney, Agent, or Firm—Robert E. Burns; Emmanuel J. Lobato; Bruce L. Adams

[57] ABSTRACT

A novel process is provided for producing prefoam type cellular concrete articles, which uses a foamed slurry (E) consisting essentially of an aqueous slurry (A) of a calcium silicate-based cement compound, an aqueous slurry (B) of a calcium aluminate-based cement compound, a specific setting retarder (C), and an aqueous foamed liquid (D). The process is further characterized in that: (i) the foamed slurry (E) is cast and provided with hardened strength sufficient for demolding in 20 to 120 minutes after it has been poured into a mold; (ii) the demolded article is subjected to precuring under specific conditions of humidity, temperature and precuring time; and (iii) the molded article is then subjected to hydrothermal curing under high pressure.

3 Claims, 1 Drawing Figure

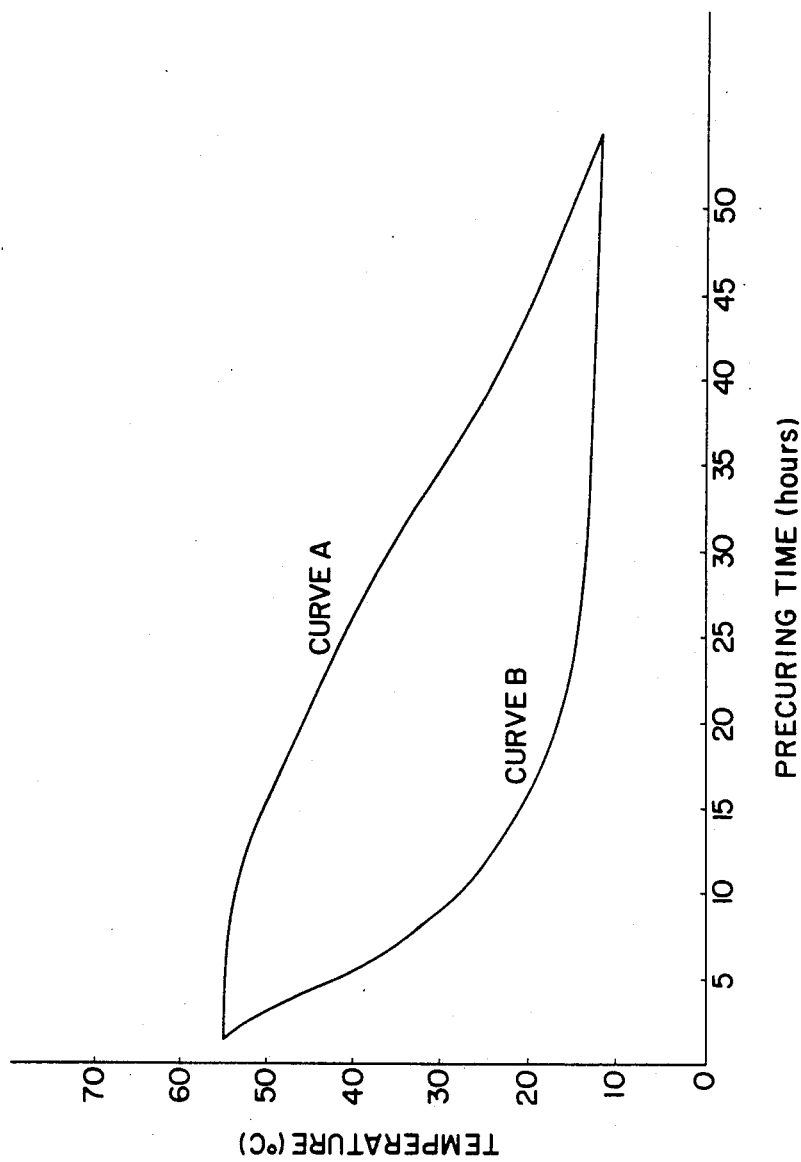

PROCESS FOR PRODUCTION OF CELLULAR CONCRETE

BACKGROUND OF THE INVENTION

Field of the Art

This invention relates to a process for production of foamed or cellular concrete molded articles in a so-called prefoam manner by subjecting a molded article obtained from the slurry of a rapid-hardening cement compound to high-temperature and high-pressure curing. More particularly, the invention relates to a process for producing cellular concrete which is characterized by the method of controlling the setting of a foamed slurry of the rapid-hardening cement compound and of developing the strength of the molded article to be subjected to high-temperature and high-pressure curing.

Cellular concrete has been spotlighted from the view points of weight reduction and energy saving in concrete construction. The so-called prefabrication of concrete products has been developed, and a variety of cellular concrete panels have been used.

Such cellular concrete is represented by autoclaved light-weight concrete (hereinafter referred to as ALC). ALC has a large market as stable building material in various forms and is a light-weight concrete (LC) comprised of crystalline calcium silicate hydrate of tobermorite species which has been produced by curing pre-foamed set products in an autoclave under pressurized hydrothermal conditions.

The ALC now produced on an industrial scale can be classified into the so-called post-foam type and the pre-foam type in view of the difference in forming cellular structures. The former, post-foam process, is carried out by introducing a hydraulic cement compound slurry into a mold and foaming it with hydrogen gas generated from the reaction of aluminum powder added into the cement compound with an alkali component which comes from cement or lime. According to this process, the height of the foamed mass in a mold is limited to about 60 cm in order to secure uniformity of upright direction foaming conditions, in view of the static pressure of the cement compound slurry under foaming in the mold. Thus, in order to increase the efficiency in the use of costly molds, panels or slabs (before curing) of 60-cm width, due to the above mentioned foamed height, the resulting foamed products are produced by slicing vertically to a predetermined thickness.

As is clear from the above described procedure, conventional cellular concrete panels of the post-foam type are not satisfactory for large-sized products, complicated shapes, designs, etc.

Such problems can be essentially solved by the so-called pre-foam process wherein foam is introduced into a hydraulic cement compound slurry, and then the foamed slurry is poured into a mold. In this case, however, one mold is used for each panel or slab. Therefore, it is essential to shorten the time between pouring and demolding by rapidly hardening the cement compound slurry in order to increase the efficiency in the use of the costly molds. On the other hand, in order to (i) prevent such phenomena as local setting of the cement slurry, segregation of high-density components, and defoaming in the mold in the procedure between pouring and demolding, and to (ii) carry out surface treatment such as scraping (leveling) of protuberant portions over the mold, planing of the surface, or stamping design patterns, it is essential that the cement slurry under setting have suitable consistency for a period necessary for such surface treatment. In view of this necessity, one measure which may appear to be appropriate is to incorporate a setting retarder in the rapid-hardening cement compound slurry. However, it is not always easy to select a setting retarder fit for the purpose.

On the other hand, when a calcium aluminate is used as a rapid-hardening cement compound, it is necessary to pay attention to its transition reaction after hardening. That is, calcium aluminates are usually derived from minerals such as $C_{12}A_7$, $CA$, $CA_2$, $C_3A$, $C_4AF$, and $C_3A_3CaSO_4$ (wherein C denotes CaO and A denotes $Al_2O_3$). These produce minerals having a large amount of water of crystallization at the begining of the hydration reaction and are gradually converted into minerals having less water of crystalization after heating. For example, a representative reaction for the hydration of CA is as follows.

$$CAH_{10} \rightarrow C_2AH_8 \rightarrow C_3AH_6$$

This reaction is a transition reaction. It is known that, especially in the process of $C_2AH_8 \rightarrow C_3AH_6$, a decrease in the strength properties of the resulting structure takes place because of the porosity thereof caused by a change in volume or release of water during the reaction. As in the case of the cellular concrete molded articles prior to autoclave curing, the strength of the molded article is still low, and yet the molded article must stand without a support after it has been demolded. Because of the above mentioned decrease in strength during the transition reaction, the molded article may fail to withstand its own weight. Thus, a flow of the structure often occurs and sometimes its collapse.

SUMMARY OF THE INVENTION

An object of the present invention is to solve the above described problems by using a specific setting retarder and conducting a specific precuring prior to an autoclave curing.

According to this invention, there is provided a process for producing cellular concrete which comprises mixing (A) an aqueous slurry of a cement compound comprising a calcium silicate as a main hydraulic mineral component, (B) an aqueous slurry of a rapid-hardening cement compound comprising a calcium aluminate as a main hydraulic mineral component, (C) a setting retarder, and (D) an aqueous foamed liquid to obtain a foamed slurry (E) of a rapid-hardening cement compound having an apparent specific gravity of 0.4 to 1.2, casting the resulting mixture in a mold, and subjecting the resulting molded article, after demolding, to high-temperature and high-pressure hydrothermal curing to produce a cellular concrete article, and which is characterized in that the process is conducted under the following conditions (1) through (4).

(1) The setting retarder (C) is at least one member selected from the group consisting of (a) an alkali metal citrate, (b) an alkali metal tartarate, (c) citric acid and an alkali metal carbonate or bicarbonate, and (d) tartaric acid and an alkali metal carbonate or bicarbonate.

(2) The foamed slurry (E) of the rapid-hardening cement compound is provided with strength sufficient for demolding thereof without deformation in 20 to 120 minutes after pouring into the mold, and is then demolded.

(3) The resulting demolded article is subjected to precuring which comprises maintaining it in a warm wet state under atmospheric pressure under the conditions of temperature and period of time corresponding to the region surrounded by the curves A and B in the attached drawing, whereby at least a part of the initial strength dependent upon the hydration of the calcium aluminate from the slurry (B) in the molded article is replaced by the strength imparted by the hydration of the hydraulic cement compound from the slurry (A).

(4) The molded article is then subjected to high-temperature and high-pressure hydrothermal curing at 150° to 190° C.

According to the present invention, the above stated object as well as optimum setting-retardation can be achieved. Moreover, the problem with respect to the strength of demolded articles is solved. That is, the initial hardness of the molded article at the time of demolding depends upon the strength resulting from the hydration of a calcium aluminate which is the rapid-hardening component. After demolding, the strength of the calcium silicate-based cement compound is developed gradually and suitably by providing appropriate warm wet conditions. Thus, by gradually causing the transition reaction of the calcium aluminate to take place before the strength of the molded article becomes sufficiently high, the shifting of the strength due to the two hydration reactions can be smoothly carried out.

BRIEF DESCRIPTION OF THE DRAWING

In the drawing, the single FIGURE is an explanatory graph indicating the relation between temperature and precuring period of time according to the present invention.

DETAILED DESCRIPTION OF THE INVENTION

Foamed Slurry of Rapid-Hardening Cement Compound (E)

The foamed slurry (E) of a rapid-hardening cement compound, by which the setting and the development of strength of the molded article are to be controlled according to the present invention, comprises components (A) through (D). The components (A) through (D) themselves are all known.

Aqueous slurry (A)

The aqueous slurry (A) is an aqueous slurry of a cement compound comprising calcium silicate as a main hydraulic mineral component.

The cement compound is used to produce a crystalline calcium silicate hydrate of the tobermorite species through high-temperature and high-pressure hydrothermal curing, the details of which are well known with respect to conventional ALC.

The compound comprises CaO and $SiO_2$ as main components, preferably in a weight ratio of the order of from 5:5 to 2:8. The aqueous slurry (A) can be obtained by mixing fine powder of cement materials (such as Portland cement), CaO, silica, etc. in such quantities as to provide the above mentioned CaO to $SiO_2$ ratio in accordance with the intended purposes, and then dispersing the resulting mixture in water.

To the aqueous slurry (A) calcium sulfate, lime and the like can be added for the purpose of adjusting the setting speed thereof. Of course, sand, perlite powder and other aggregates, reinforcing fiber materials, coloring pigments, etc., can also be added thereto. The concentration of the slurry is approximately 40 to 75% by weight in a total solid basis.

The term "the cement compound" with regard to the aqueous slurry (A) (as well as the aqueous slurries (B) and (E)) in the present invention includes not only cement compositions containing in addition to cement silica, CaO, sand and other components but also cement alone.

Aqueous slurry (B)

The aqueous slurry (B) is an aqueous slurry of a rapid-hardening cement compound comprising a calcium aluminate as a main hydraulic mineral.

This cement compound comprises, in its chemical composition, the minerals such as $C_{12}A_7$, $CA$, $CA_2$, $C_3A$, $C_2AS$, $C_4AF$, $C_{11}A_7CaF_2$, $C_3A_3CaF_2$, $C_3A_3\cdot CaSO_4$, etc. (wherein, C denotes CaO, A denotes $Al_2O_3$ and S denotes $SiO_2$).

This cement compound is exemplified by alumina cement and CSA (calcium sulfoaluminate).

The concentration of the slurry is of the order of 40 to 75% by weight on a total solid basis.

Setting Retarder (C)

The setting retarder to be used in the present invention is selected from the group consisting of (a) through (d) mentioned hereinbefore. The "alkali metal salt" is represented by Na salts and K salts.

Although the setting retarder may be one selected from the groups (a) through (d), two or more types (including two or more types within the same group) thereof can be used in combination. In the case where two types of the retarder are used in combination, it is preferable to add and dissolve retarder(s) (a) or/and (b) (i.e. alkali metal salt(s) of hydroxycarboxylic acid(s)) into the slurry (A), and retarder(s) (c) or/and (d) (i.e. hydroxycarboxylic acid(s) and alkali metal carbonate(s) or bicarbonate(s) into the slurry (B), respectively. By using the setting retarders in this manner and appropriately selecting the type and amount of the setting retarder, it is possible to provide an exotherm-dwell period during the initial setting stage of the rapid-hardening cement compound slurry (E).

The amount of the setting retarder is so suitably determined that strength sufficient for demolding can be developed in 20 to 120 minutes after pouring of the slurry (E).

Aqueous foamed liquid (D)

Aqueous foamed liquid used in a prefoam method is also known. Any of such liquids can be used in the present invention as long as it is appropriate.

An aqueous foamed liquid is usually obtained by foaming an aqueous solution of a foaming agent with stirring, blowing and the like. It is desirable that the foaming agent have excellent stability, and anionic synthetic surface active agents or foaming agents based on protein hydrolyzates are normally used.

Suitable aqueous foamed liquids have an apparent specific gravity of the order of 0.01 to 0.20.

Foamed slurry (E)

The foamed slurry (E) of a rapid-hardening cement compound to be cast is a mixture of the above described components (A) through (D).

The amounts of these components may be selected at will as long as they produce the intended result. In general, however, the aqueous slurry (B) is ordinarily used in an amount such that the quantity of the main hydraulic mineral component thereof is of the order of 3 to 30% by weight of that of the aqueous slurry (A). The amount of the aqueous foamed liquid (D) is so determined that the expected foamed state (specific gravity) will be obtained, that is, in the present invention, the apparent specific gravity of the slurry (E) will be from 0.4 to 1.2.

The foamed slurry (E) should be produced by preparing at least the aqueous slurries (A) and (B) separately and then mixing them. However, the ordinary and preferable procedure is to produce the slurry (E) by separately preparing the slurries (A) through (D) and then mixing them. In the latter case, there can be some time delay in the contacting of the four components.

The water content of the foamed slurry (E) is of the order of 40 to 75% by weight of the total amount of the compounds (solid contents) of the aqueous slurries (A) and (B). This water is ordinarily distributed among the components (A), (B), and (C) and brought to the foamed slurry (E), the specific distribution proportions being determined with consideration of workability.

The specific gravity of the foamed slurry (E) is determined according to the amount of the aqueous foamed liquid (D) added as well as the degree of escape of the foam after the addition thereof. On the other hand, the specific gravity of the cellular concrete product is determined by that of the foamed slurry (D).

Production of Cellular Concrete

The process for producing cellular concrete according to the present invention is characterized in that, in addition to the use of the foamed slurry (E) of a rapid-hardening cement compound as described above, special precuring is conducted prior to autoclave curing. Except for the above, the process is essentially not different from conventional prefoam processes.

Casting and Demolding

The above described slurry (E) is poured into a mold having a specific shape and size (of course, suitable steel reinforcements may be arranged in the mold, as necessary). Then, after a suitable period of time, the molded article is demolded.

According to the present invention, the composition of the slurry (E) is so adjusted that the strength which enables demolding will be developed in 20 to 120 minutes after the pouring. If the period of time between pouring and demolding is less than 20 minutes, the workability will be poor. If it is more than 120 minutes, the productivity will be decreased, and the effectiveness of the rapid-hardening agent will be lowered.

By the term "strength which enables demolding" is specifically meant, for example, a strength in terms of proctor value of not less than 40 psig. Incidentally, this strength of the demolded article, i.e., the initial hardness results mainly from the hydration of the calcium aluminate.

Precuring

After demolding, the resulting molded article is maintained substantially in a warm wet state at atmospheric pressure under specified temperature/period conditions, whereby at least a part, preferably the greater part, of the initial hardness which depends upon the hydration of the calcium aluminate from the slurry (B) in the molded article is replaced by the strength caused by the hydration of the hydraulic cement compound from the slurry (A).

By the term "a warm wet state" in this case is meant a state defined by a temperature as given below and a humidity value corresponding to the state in a room of not less than 90% relative humidity or to the state wherein the surface of the molded article is moistened by sprinkling or the like.

Such a warm wet state must be maintained at a temperature and for a period of time corresponding to the region surrounded by the curves A and B in the attached drawing. More specifically, it is necessary that the transition reaction of the calcium aluminate from the slurry (A) occur when the strength of the cement compound from the slurry (A) has been developed to a suitable degree. Under such conditions corresponding to the region below the curve B of the drawing, however, plastic flow of the molded article occurs owing to the transition reaction, resulting in a decrease in physical properties or generation of cracks or collapse because the above described balance is not properly kept. On the other hand, under the conditions corresponding to the region above the curve A, hydration of the cement compound from the slurry (A) takes place excessively, resulting in a decrease in the strength of the molded article after autoclave curing, although distortion of the molded article owing to the transition reaction can be suppressed. The specific precuring time depends upon the type of the given slurry (E) and the period of time between pouring and demolding. In most cases, it will not exceed 35 hours. When the precuring is carried out over a holiday, however, it will be allowed to be more than 35 hours.

Autoclave Curing

The autoclave curing to be conducted after the precuring of the molded article comprises subjecting the article to hydrothermal conditions at a temperature of 150° to 190° C. in an autoclave. The autoclave curing in the production of cellular concrete molded articles is well known. The present invention can utilize such well-known techniques unless otherwise specified.

EXPERIMENTAL EXAMPLE

To a slurry (A) comprising 100 parts of Portland cement, 120 parts of silica sand powder, 10 parts of a cement additive, 0.7 part of sodium citrate and 115 parts of water, were added a slurry (B) comprising 20 parts of alumina cement and 15 parts of water and an aqueous foamed liquid in such an amount as to make the specific gravity of the resulting mixture 0.72. The mixture was poured into a mold and thus cast. After the resulting molded article was demolded within one hour, it was subjected to precuring for 20 hours with water sprinkling at 30° C. and then to hydrothermal curing in an autoclave at 180° C. Thus, cellular concrete having an absolute dry specific gravity of 0.50 was obtained. All quantities expressed above in parts are by weight.

What is claimed is:

1. In a process for producing cellular concrete which comprises mixing (A) an aqueous slurry of a cement compound comprising calcium silicate as a main hydraulic mineral component, (B) an aqueous slurry of a rapid-hardening cement compound comprising a calcium aluminate as a main hydraulic mineral component, (C) a setting retarder, and (D) an aqueous foamed liquid to obtain a foamed slurry, and (D) an aqueous foamed liquid to obtain a foamed slurry (E) of a rapid-hardening cement compound having an apparent specific gravity of 0.4 to 1.2, casting the resulting mixture in a mold, and subjecting the resulting molded article, after demolding, to high-temperature and high pressure hydrothermal curing to produce a cellular concrete article, the improvement which comprises conducting the process under the following conditions (1) through (4):

(1) the setting retarder (C) is at least one member selected from the group consisting of (a) an alkali metal citrate, (b) an alkali metal tartarate, (c) citric acid and an alkali metal carbonate or bicarbonate, and (d) tartaric acid and an alkali metal carbonate or bicarbonate;

(2) the amount of setting retarder is such that strength sufficient for demolding without deformation is developed in 20 to 120 minutes after pouring the foamed slurry (e) into the mold, and the product is then demolded;

(3) the resulting demolded article is subjected to pre-curing which comprises maintaining it in a warm wet state under atmospheric pressure under the conditions of temperature and period of time corresponding to the region surrounded by the curves A and B in the attached drawing, whereby at least a part of the initial strength dependent upon the hydration of the calcium aluminate from the slurry (B) in the molded article is replaced by the strength imparted by the hydration of the hydraulic cement compound from the slurry (A); and (4) the molded article is then subjected to high-temperature and high-pressure hydrothermal curing at 150° to 190° C.

2. The process according to claim 1, in which the weight ratio in the chemical composition of $CaO:SiO_2$ in the aqueous cement compound slurry (A) is in the range of from 5:5 to 2:8.

3. The process according to claim 1 or 2, in which the quantity of the aqueous rapid-hardening cement compound slurry (B) is 3 to 30% by weight of the aqueous cement compound slurry (A).

* * * * *